May 26, 1925.                T. VAN BUUREN                1,539,445

WHEEL SKATE

Filed Oct. 17, 1923

Inventor
Theodoor van Buuren

By  Emil Bönnelycke
                    Attorney

Patented May 26, 1925.

1,539,445

UNITED STATES PATENT OFFICE.

THEODOOR VAN BUUREN, OF AMSTERDAM, NETHERLANDS.

WHEEL SKATE.

Application filed October 17, 1923. Serial No. 669,136.

*To all whom it may concern:*

Be it known that I, THEODOOR VAN BUUREN, a citizen of the Kingdom of the Netherlands, residing at Amsterdam, Netherlands, No. 9 Hoogeweg, have invented certain new and useful Improvements in Wheel Skates, of which the following is a specification.

There are known wheel skates or roller skates in which the front and rear wheels are arranged respectively in front of and in the rear of the footplate, the arrangement being such that the axes of both wheels are below the plane of the footplate, both wheels running in the same vertical plane which is always, that is also during the running, at right angles to the centre line of the footplate.

In the wheel skate forming the subject of the present invention, the foot plate, the bearings for the two wheels and the rearwardly bent brake placed behind the rear wheel, form one unit, the footplate and the axes of rotation of the wheels having fixed positions relatively to one another and lying in the same plane. By this construction, it is achieved that the distance between the foot and the running surface or track is not excessively large, it being at the same time possible to make the wheels of comparatively large diameter, thus facilitating the running, obviating any risk of twisting or spraining the feet, reducing the required driving power to a minimum, and enabling shocks and vibrations due to irregularities of the running surface or road to be taken up by pneumatic tyres and by making the whole unit consisting of the foot plate and the wheel bearings resilient.

As the wheel skates forming the subject of the invention are chiefly intended for use on public roads and must therefore be capable of running down slopes, a brake is provided behind the rear wheel which may be used without any danger to the skater falling forward or losing control of the skates. As the whole frame is made in one piece, the improved wheel skate may be easily and cheaply manufactured.

Figure 1:
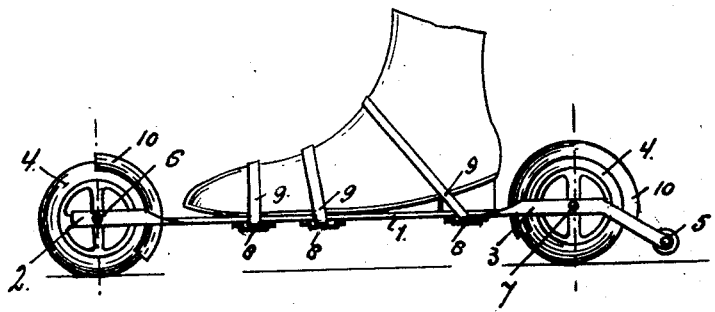
Figure 2:
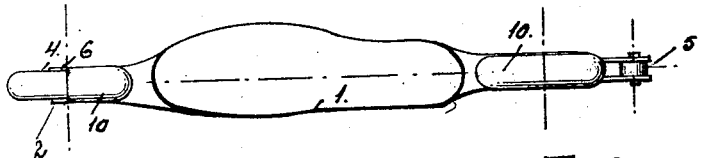
Figure 3:
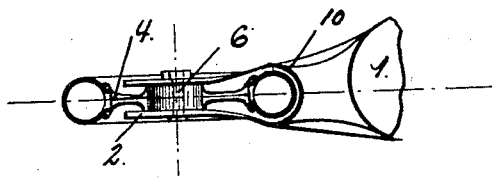

One construction embodying the features of the invention is shown in the accompanying drawing in which Figure 1 is a side elevation of the improved skate; Fig. 2, a top view thereof; and Fig. 3, a detail view, on a slightly enlarged scale and partly in horizontal section, showing the mounting of the front wheel.

The wheel skate comprises a somewhat resilient footplate 1 of light metal, which is extended forwards and backwards. The extensions 2 and 3 are bent at right angles, thus providing fork shaped brackets for the reception of the axles 6 and 7 of the wheels 4 which are provided with pneumatic tyres. The fork shaped rear extension 3 projects rearwardly behind the rear wheel 4 and is bent downwardly for the reception of the slide brake 5.

The foot plate is provided with strap guides 8 for the reception of the straps 9. Wheels 4 are provided with splash guards 10, and may be provided with ball bearings to reduce as much as possible the friction. The wheel skate is fixed to the boot by means of the straps 9, as is usual with roller skates. Obviously the boot might be rigidly connected with the footplate.

The wheel skate is used in a similar manner as an ordinary skate. The foot may be slightly lifted in front so as to raise the front wheel from the track. The slide brake 5 may at the same time be brought into contact with the track so that it slides on the track and produces a braking action.

I claim as my invention:

1. A skate, comprising in combination a metal foot plate having forwardly and rearwardly extending bifurcated portions at its opposite ends which are disposed substantially co-planar therewith; the members of each bifurcated portion being twisted at right angles to the body of the plate and formed with alining openings, and the free outer ends of the members of the rear bifurcated portion being bent downward and rearward; front and rear wheels journaled in said bifurcated portions with their axles mounted in the alining openings in the twisted members thereof, and a brake roller journaled in the bent ends of the members of the rear bifurcated portion.

2. A wheel skate, comprising a foot plate; two tire-carrying wheels, one in front and one in rear of the foot plate, arranged in a vertical plane passing through the centre line of the plate, the plane of the wheels and the plane of the foot plate intersecting at right angles, and the latter plane passing through the axes of rotation of the wheels; said foot plate having twisted extensions at opposite ends forming the wheel forks, and the rear fork being bent downward in rear of the rear wheel to form a brake support, so that the plate, the wheel forks and the brake support thus conjointly form a single unit; and a brake mounted in said support.

In testimony whereof I affix my signature

THEODOOR van BUUREN.

Witnesses:
H. Y. KUYPERS,
C. GORTER.